United States Patent [19]

Jackson et al.

[11] 4,248,034
[45] Feb. 3, 1981

[54] ADJUSTABLE AXLE SUPPORT SYSTEM FOR LAWN MOWER

[75] Inventors: Harold P. Jackson; Richard W. Rhinehart, both of McDonough, Ga.

[73] Assignee: McDonough Power Equipment, Division of Fuqua Industries, Inc., McDonough, Ga.

[21] Appl. No.: 78,502

[22] Filed: Sep. 24, 1979

[51] Int. Cl.³ .......................................... A01D 67/00
[52] U.S. Cl. .................................... 56/17.2; 280/43
[58] Field of Search ............... 56/17.2, 320.1, 17.1, 56/320.2, 255; 280/43, 43.13, 43.17, 43.19

[56] References Cited

U.S. PATENT DOCUMENTS

| | | | |
|---|---|---|---|
| 2,728,582 | 12/1955 | Knarzer | 280/43 |
| 2,894,761 | 7/1959 | Knarzer | 56/17.2 |
| 2,909,884 | 10/1959 | Knarzer | 56/320.1 |
| 4,107,907 | 8/1978 | Rutherford | 56/320.2 |

FOREIGN PATENT DOCUMENTS

| | | | |
|---|---|---|---|
| 621148 | 5/1961 | Canada | 280/43 |
| 1188348 | 3/1965 | Fed. Rep. of Germany | 56/17.2 |
| 1067420 | 5/1967 | United Kingdom | 280/43 |

*Primary Examiner*—Paul J. Hirsch
*Attorney, Agent, or Firm*—William E. Mouzavires

[57] ABSTRACT

An adjustable axle support system for a lawn mower for supporting the wheels and blade housing at a preselectable elevation in accordance with a desired cutting height of the grass cutting blade which is rotatable in a horizontal plane within the blade housing of the mower. The system includes brackets fixed to the opposite ends of the front and rear sections of the blade housing with the axles received in vertical slots formed in the brackets. Axle bearings are slidable on the axles for receipt in enlarged openings formed along the slots in the brackets. The axle bearings are biased into the selected enlarged openings by coil compression springs received about the axles. Adjustment of the height of the blade housing and in turn the cutting blade is achieved simply by retracting the bearings along the axles against the bias of the springs and moving the axles along the slots in the brackets into the desired elevation and then placing the bearings into the appropriate enlarged openings along the bracket slots.

13 Claims, 7 Drawing Figures

ADJUSTABLE AXLE SUPPORT SYSTEM FOR LAWN MOWER

OBJECTS OF INVENTION

The present invention relates to an improved axle support system for lawn mowers of the type having a blade housing with a grass cutting blade rotatable about a vertical axis in a horizontal plane within the blade housing. The housing is supported on the ground by means of wheels which are mounted on front and rear axles. The system of the present invention mounts the axles to the blade housing while, at the same time, permitting the elevation or the height of the axles to be adjusted relative to the blade housing so as to change the height of the grass cutting blade within the housing in order to achieve a desired grass cut.

It is an object of the present invention to provide an improved axle support system of the type described for a lawn mower which system has a minimum of parts and yet will be durable and easily adjustable so as to place the cutting blade at a desired height for a specific grass cutting operation.

Another object of the present invention is to provide such an axle support system of the type described which maintains at all times the same wheel base (the distance between the front and rear axles), regardless of the particular height into which the axles have been adjusted. This is to be contrasted with conventional height adjustment mechanisms which, in carrying out a height adjustment, alter the distance between the front and rear axles which can result in scalping of the grass during an operation.

Another object of the present invention is to provide such an axle support system which may be utilized on lawn mowers with a single front axle for supporting the front wheels and a single rear axle for supporting the rear wheels, thereby increasing the strength and simplicity of the wheel support system as well as the entire mower in general.

Yet another object of the present invention is to provide such an axle support system which helps to prevent the axle as well as its bearings from rotating, leaving the wheels to rotate relative to the axles as is desired, to thus decrease wear and increase the life of the system.

SUMMARY OF INVENTION

In summary, the present invention is achieved by providing front and rear axle mounting brackets fixed to the blade housing with elongated slots in vertical walls of the brackets receiving the axles with the wheels being mounted for rotation on the axles outwardly of the brackets. The elongated slots in the brackets are provided with a series of vertically spaced enlarged openings for removably receiving axle bearing sleeves which are slidable on the axles into and out of the enlarged openings. Springs are provided about the axles for yieldingly urging the axle bearings into the desired enlarged openings in the brackets to thus prevent vertical movement of the axle relative to its support out of the adjusted position. It is also preferred that the brackets be formed with two vertically spaced walls with one wall containing the enlarged openings for receiving the bearings and another wall containing an elongated slot receiving the axle for guiding the axle in the proper position during its adjustment.

DRAWINGS

Other objects and advantages of the present invention will become apparent from the following more detailed description taken in conjunction with the attached drawings in which.

DETAILED DESCRIPTION

Figure 1:
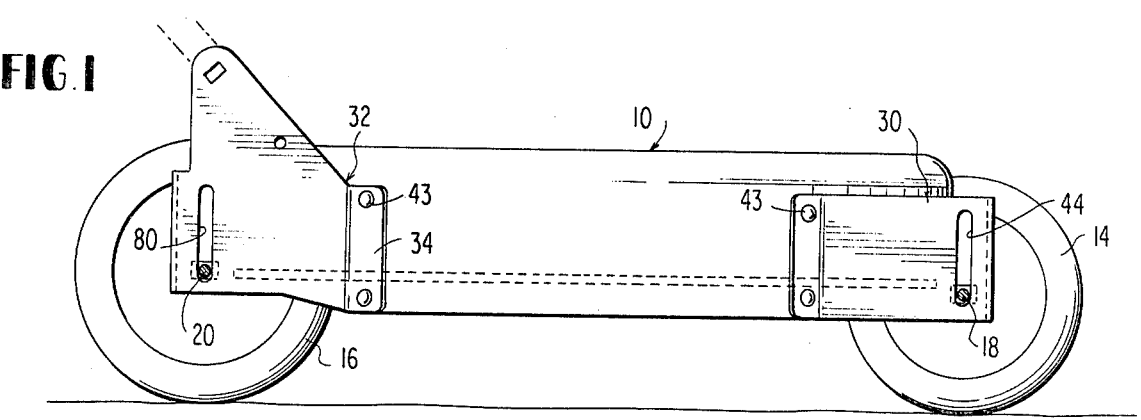
FIG. 1 is a side elevational view of a lawn mower embodying the axle support system of the present invention.

Referring now to the drawings in detail, there is shown for illustrative purposes only a lawn mower of the walk-behind type incorporating the axle support system of the present invention, although it should be understood that the present invention may be utilized with power driven lawn mowers or other types of mowers as will become apparent. The specific lawn mower shown includes a blade housing generally designated 10 which mounts and encloses a horizontal cutting blade 11 which is driven by an engine (not shown) typically mounted on the blade housing. Grass cutting blade 11 rotates in a horizontal plane within blade housing 10 about a vertical axis and one of the purposes of the axle support system of the present invention is to permit the cutting height of the blade or, stated differently, the vertical distance between the blade and the ground to be adjusted in order to permit the grass to be cut at a certain height as desired. FIG. 1 also illustrates in dotted lines, a handle 12 which is fixed relative to the blade housing in a manner to be described below for purposes of pushing the lawn mower over the ground surface during operation or otherwise.

Figure 2:
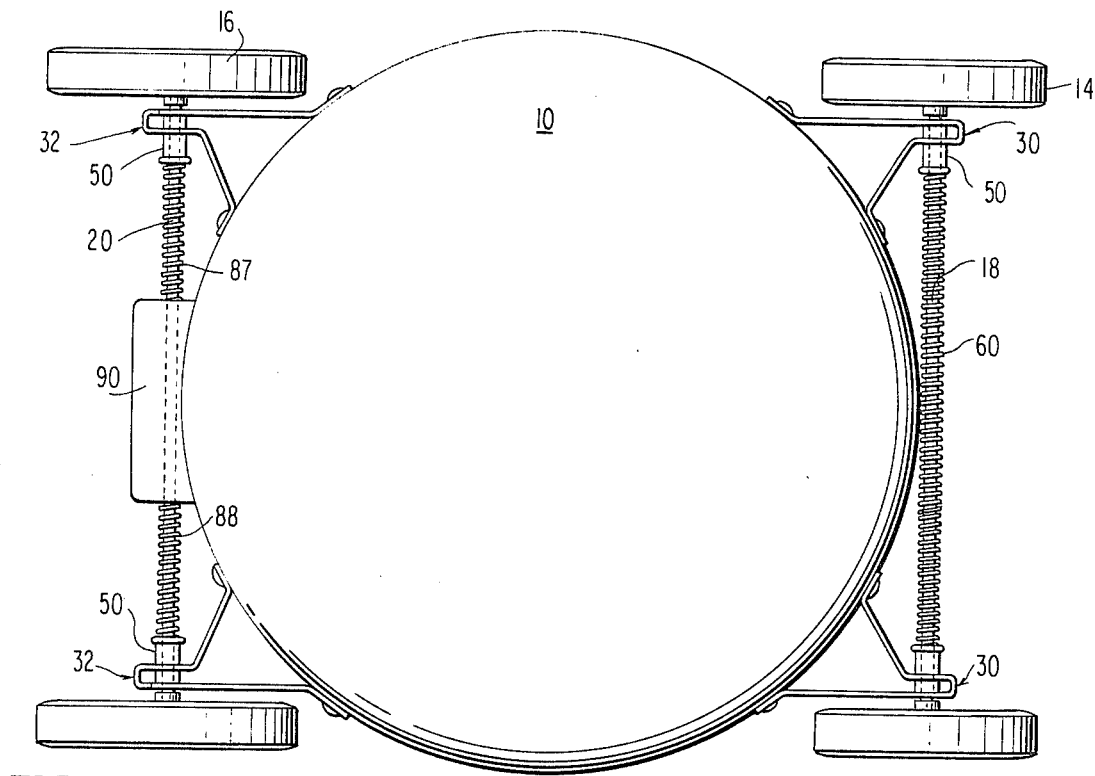
FIG. 2 is a plan view of the lawn mower shown in FIG. 1.
Figure 3:
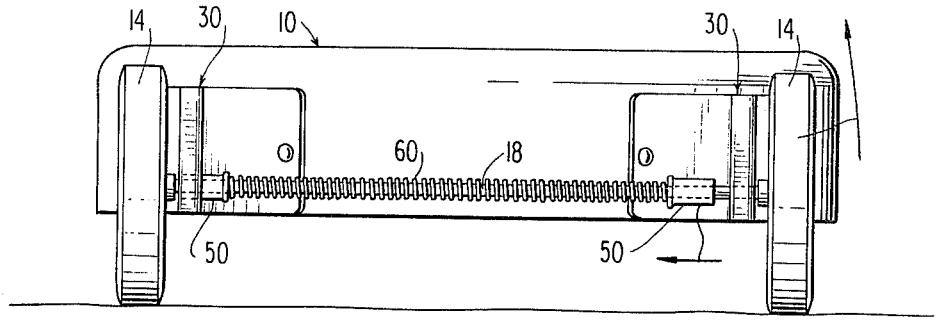
FIG. 3 is a front elevational view of the lawn mower.

Referring to FIG. 2, the mower typically includes a pair of front wheels 14 mounted on a front axle 18 for rotation relative to the front axle 18 which extends transversely across the front end of the mower. Also included in the shown lawn mower, are a pair of rear wheels 16 mounted on a rear axle 20 for rotation relative thereto; the rear axle 20 extending transversely at the rear of blade housing 10. The wheel axles are mounted to the blade housing 10 by means of an improved support system in accordance with the present invention which includes a pair of front axle support brackets 30 and a pair of rear axle support brackets 32.

Figure 4:
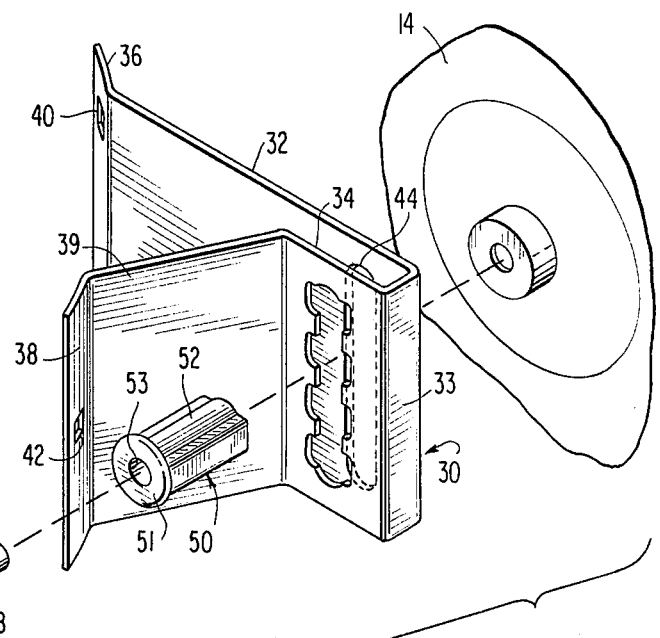
FIG. 4 is a perspective assembly view of portions of the front wheel and axle assembly and one of its supporting brackets.

Referring to FIG. 4, each front axle support bracket 30 includes in the preferred embodiment, an outer vertical side wall 32 and an inner vertical side wall 34 spaced from each other by a front wall formed by a bend 33. Support bracket 30 is fixed to the vertical cylindrical skirt of blade housing 10 by flanges 36 and 38 formed at the ends of the outer and inner side walls 32 and 34. Flanges 36, 38 are provided with apertures 40, 42 for receiving fasteners 43 shown in FIG. 1 for rigidly securing the bracket to the skirt of blade housing 10.

In the specific embodiment shown, outer side wall 32 of bracket 30 has a generally rectangular shape with its flange 36 projecting outwardly at an angle while inner side wall 34 has an intermediate section 39 which interconnects flange 38 and the front section of the inner side wall 34 as best shown in FIG. 4. Support bracket 30 is made from a suitable sturdy material such as sheet steel which may be shaped to provide the various walls and flanges as an integral one-piece structure.

Figure 5:
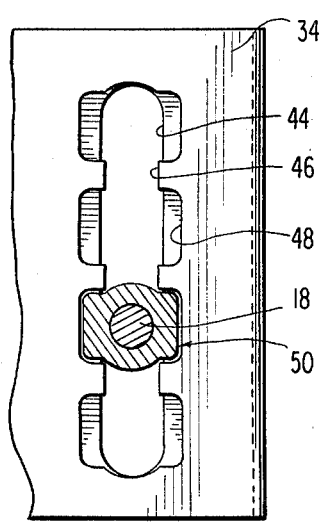
FIG. 5 is a side elevational view of a fragment of one of the front supporting brackets for the axle.

In order to mount front axle 18 in front brackets 30, the latter are provided with apertures which, in the shown embodiment, include a first elongated slot 44 extending vertically in the outer side wall 32 and a second elongated slot, portions of which are shown as 46 in FIG. 5 extending vertically in inner side wall 34 in general alignment with the slot 44 in outer side wall 32. Front axle 18 is received through the slots and is vertically adjustable along the slots in order to adjust the elevation of the axle and, in turn, the elevation of the blade housing 10 and, in turn, the elevation of the cutting blade 11.

In order to releasably lock axle 18 in the desired elevation within the slots of brackets 30, slots 46 in the inner side walls 34 of the brackets are provided with enlarged locking apertures 48 spaced along the vertical dimension of the slots. In addition, axle bearings generally designated 50 are provided on opposite ends of the axle to be selectively received in any of the enlarged locking apertures 48 for locking the axle therein. Axle bearings 50 are each in the form of a sleeve made from any suitable material including an enlarged circular head 51 on the inner end thereof and a generally rectangular body which, in the specific embodiment shown, includes arcuate upper and lower surfaces 52 extending along the body at a central portion thereof. A through passage 53 is provided for receiving axle 18 with the bearing 50 being slidable along axle 18 for purposes of inserting the bearing 50 within any of the enlarged openings 48 of the associated support bracket 30. Once bearings 50 are received in any one of the enlarged openings 48 of the support brackets 30, axle 18 will be locked in the brackets against the vertical movement.

In order to urge bearings 50 within any one of their associated enlarged openings 48 of the associated support bracket 30 against axial movement, a coil compression spring 60 is provided about front axle 18 substantially along the entire length thereof so that the opposite ends of the spring engage inner heads 51 of the bearings 50 to yieldingly urge bearings 50 outwardly of the axle to maintain bearings 50 within brackets 30 and the outer ends of bearings 50 engaging the inner surface of outer wall 32 of associated support bracket 30. Although the springs 60 are preferred for releasably holding the bearings 50 within brackets 30, other means such as releasable locks or latches may be utilized instead.

It should be seen from the above that when it is desired to change the elevation of the cutting height of mower blade 11, one merely has to grasp bearing 50 on one end of axle 18 and retract it along axle 18 against the bias of spring 60 until the bearing is removed from elongated opening 48. This free end of the axle may then be raised or lowered into the desired elevation after which bearing 50 is released so that spring 60 will restore bearing 50 in the appropriate enlarged opening 48 of the associated bracket. In making this adjustment, the bearing at one end of axle 18 is first adjusted and then bearing 50 on the other end of the axle is adjusted into the same elevation. During the aforementioned adjustment when axle 18 is being moved vertically in bracket 30 to the desired elevation, elongated slot 44 in outer side wall 32 of bracket 30 will function as a guide to maintain axle 18 in a vertical path between the enlarged openings 48 so as to facilitate the adjustment.

Figure 6:
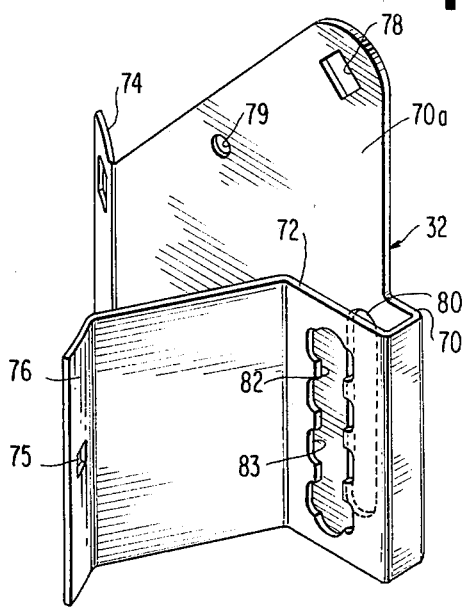
FIG. 6 is a perspective view of one of the support brackets for the rear axle.

Referring now to FIGS. 2 and 6, it will be seen that rear support brackets 32 for rear axle 20 have the same basic characteristics as front support brackets 30. That is to say, rear support brackets 32 each have parallel and spaced inner and outer vertical side walls 70 and 72 with an elongated vertical guide slot 80 in outer wall 70 and an elongated slot 82 in inner wall 72 for receiving rear axle 20. Slot 82 on inner side wall 72 has a series of vertically spaced enlarged openings 83 for receiving an axle bearing 50 as is the case with front brackets 30. In addition, rear brackets 32 have mounting flanges 74 and 76 with apertures 75 therein for receiving fasteners 43 for securing the rear brackets to blade housing 10.

Rear brackets 32 however differ from front brackets 30 in that the outer side wall 70 of the former extend vertically a greater distance at 70a (see FIG. 6) for purposes of mounting the handle 12 (see FIG. 1) thereto by means of apertures 78 and 79 formed in the upper section 70a of side wall 70. It will thus be seen that the rear mounting brackets 32 are mirror images of each other, whereas front brackets 30 are identical pieces.

Another difference between the front and rear axle support systems is that instead of a single spring such as utilized at 60 on the front axle 18 to bias bearings 50 in the associated front brackets 30, the rear axle support system utilizes two springs 87 and 88 received about opposite end portions of rear axle 20 for biasing an associated bearing 50 into rear bracket openings 83. This is because in the shown embodiment, rear axle 20 is provided with a footguard 90 which is mounted on the center portion of rear axle 20. The inner ends of biasing springs 87 and 88 engage the opposite ends of footguard 90 as shown in FIG. 2, while the outer ends of springs 87, 88 of course engage their associated bearings 50. If desired, and although not shown, two springs may also be substituted for the single spring 60 used on the front axle 18 however in this event, a spring bearing sleeve (not shown) would be needed about the front axle 18 to engage the inner ends of such springs.

It will thus be seen that the elevation of the rear axle 20 may be adjusted by retracting bearings 50 against the bias of associated springs 87 and 88 in the same manner as described above in connection with front axle 18.

Figure 7:
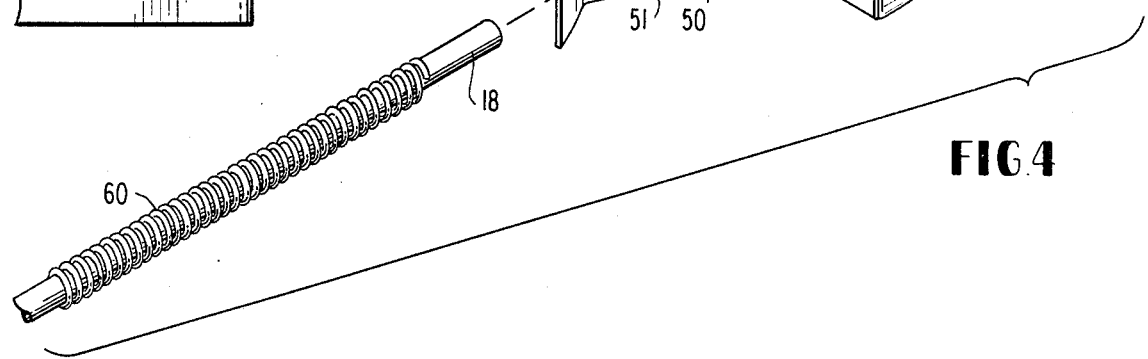
FIG. 7 is a view generally similar to FIG. 5 but illustrating a modified bracket for supporting the axles.
Figure 7:
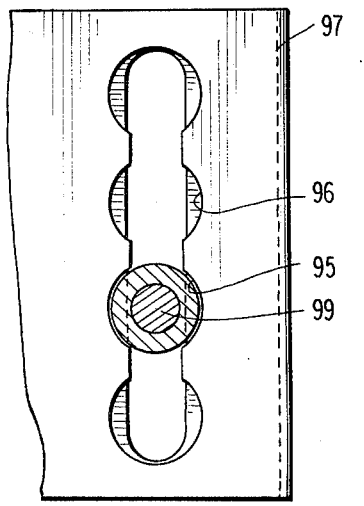

Referring now to FIG. 7, it will be seen that other shapes for axle bearings 50 and their associated slots in the brackets may be utilized. For example, in FIG. 7, the bearings have a hollow cylindrical body 95 adapted to be received in correspondingly shaped circular enlarged apertures 96 formed in inner wall 97 of the axle support bracket; the axle being illustrated as 99 in FIG. 7.

What is claimed is:

1. In a lawn mower having a blade housing including a rotatable cutting blade rotatable generally in a horizontal plane, and front and rear wheel axles with wheels on the opposite ends thereof for supporting the housing on the ground; an adjustable axle support system for supporting the wheels and axles at a preselectable elevation relative to the ground surface to provide a desired cutting height of the cutting blade, the system comprising axle support brackets generally vertically therein receiving the axles with the axles being adjustable in a vertical plane by movement along the slots, said brackets having a plurality of enlarged openings spaced along said slots, bearing sleeves slidable along the axles for reception in the enlarged openings of the brackets, and spring means about the axles releasably holding the bearings in the enlarged openings of the brackets for maintaining the wheel and axle in the brackets against vertical movement, said bearing sleeves being slidable along said axles out of said enlarged openings for permitting the axles to be adjusted along the slots in the brackets.

2. The axle support system defined in claim 1 wherein there is included two of said brackets at the front of the blade housing on the opposite ends thereof and two of said brackets at the rear of the blade housing on the opposite ends thereof and wherein there is an axle bearing associated with each of said brackets.

3. The axle support system defined in claim 1 wherein said spring means includes coil compression springs located about the axles in engagement with an associated bearing.

4. The axle support system defined in claim 2 wherein said spring means includes springs located about the axles in engagement with an associated bearing.

5. The axle support system defined in claim 4 wherein there is but one coil compression spring received about the front axle with the opposite ends of the spring bearing against an associated bearing sleeve.

6. The axle support system defined in claim 5 wherein the rear axle has a footguard mounted thereon and wherein there are two coil compression springs received about the rear axle with their inner ends engaging the footguard and their outer ends engaging an associated bearing.

7. The axle support system defined in claim 6 wherein the rear brackets are also utilized to support a handle for the mower.

8. The axle support system defined in claim 4 wherein each of said brackets includes inner and outer vertically extending walls with said enlarged openings being formed in the inner wall and wherein the outer wall includes an elongated guide slot receiving an axle for guiding the axle during vertical adjustment within its associated bracket.

9. The axle support system defined in claim 1 wherein each bracket includes inner and outer vertically extending side walls, said enlarged openings being formed in the inner wall and wherein the outer wall includes an elongated vertical slot receiving an axle.

10. The axle support system defined in claim 1 wherein said bearings have a generally rectangular body and wherein said enlarged openings in the brackets have a shape corresponding to the shape of portions of the bearings received therein.

11. The axle support system defined in claim 1 wherein said bearings have a generally cylindrical body and wherein the shape of the enlarged openings in the brackets correspond to the shape of portions of the bearings received therein.

12. In a lawn mower having a blade housing including a rotatable cutting blade rotatable generally in a horizontal plane, and front and rear wheel axles with wheels thereon for supporting the housing on the ground; an adjustable axle support system for supporting the wheels and axles at a preselectable elevation relative to the ground surface to provide a desired cutting height of the cutting blade, the system comprising axle support brackets fixed to the blade housing and having elongated slots extending generally vertically therein receiving the axles with the axles being adjustable in a vertical plane by movement along the slots, said brackets having a plurality of enlarged openings spaced along said slots, and bearing sleeves slidable on the axles for reception in the enlarged openings of the brackets, said bearing sleeves having a dimension greater than the width of the slot in the associated bracket preventing the sleeves from moving vertically within said slots, said bearing sleeves being slidable along said axles out of said enlarged openings to permit the axles to be adjusted along the slots in the brackets.

13. The lawn mower defined in claim 12 wherein said axle support brackets each includes inner and outer vertically extending walls with each wall having elongated slots therein receiving the axles and wherein one of said inner and outer walls includes said enlarged openings spaced along its slot.

* * * * *

UNITED STATES PATENT AND TRADEMARK OFFICE
CERTIFICATE OF CORRECTION

PATENT NO. : 4,248,034

DATED : February 3, 1981

INVENTOR(S) : Harold P. Jackson and Richard W. Rhinehart

It is certified that error appears in the above-identified patent and that said Letters Patent are hereby corrected as shown below:

Column 4, line 66, before "generally" insert:

-- fixed to the blade housing and having elongated slots extending --.

Signed and Sealed this

Twenty-sixth Day of May 1981

[SEAL]

Attest:

RENE D. TEGTMEYER

Attesting Officer     Acting Commissioner of Patents and Trademarks